United States Patent [19]

Leas

[11] 4,280,893

[45] Jul. 28, 1981

[54] INTEGRATED COAL CONVERSION PROCESS

[76] Inventor: Arnold M. Leas, 309 E. Van Buren, Columbia City, Ind. 46725

[21] Appl. No.: 945,828

[22] Filed: Sep. 26, 1978

Related U.S. Application Data

[62] Division of Ser. No. 858,045, Dec. 6, 1977, Pat. No. 4,132,627.

[51] Int. Cl.$^3$ .................... C10G 1/06; C10G 35/00; C10B 57/08
[52] U.S. Cl. .................................... 208/10; 208/149; 201/9
[58] Field of Search .................... 208/10, 149; 201/9

[56] References Cited

U.S. PATENT DOCUMENTS

| | | | |
|---|---|---|---|
| 2,614,038 | 10/1952 | Barr | 48/206 X |
| 2,666,733 | 1/1954 | Scovill | 208/149 X |
| 2,729,598 | 1/1956 | Garbo | 201/9 X |
| 3,755,136 | 8/1973 | Fields et al. | 208/10 X |
| 3,853,498 | 12/1974 | Bailie | 48/210 X |
| 3,912,465 | 10/1975 | Kunii et al. | 48/210 X |
| 3,945,942 | 3/1976 | Marion | 48/197 R X |
| 3,985,519 | 10/1976 | Kalina et al. | 48/202 |
| 4,002,438 | 1/1977 | Fleming | 48/76 |
| 4,032,305 | 6/1977 | Squires | 48/210 |
| 4,038,172 | 7/1977 | Ueda et al. | 208/10 |

OTHER PUBLICATIONS

Fuel, vol. 57, No. 4, Apr. 1978, pp. 213–216, Editor C. J. Rawlins, Author, D. Gray, "Inherent Mineral Matter in Coal and its Effect upon Hydrogenation".

*Primary Examiner*—Delbert E. Gantz
*Assistant Examiner*—William G. Wright
*Attorney, Agent, or Firm*—Baker & McKenzie

[57] ABSTRACT

An integrated process for the conversion of coal to liquid and gaseous fuels is disclosed. Coal and oil are hydrocracked in the presence of a particulate mixture of sand or clay and an iron and chromium alloy to form carbon-coated sand and an overhead product comprising cracked oil vapors and fuel gases. The carbon is removed from the sand to form carbon monoxide with the concomitant generation of heat. The carbon monoxide is used to reduce oxidized iron and chromium alloy located in a hydrogen generating bed. Steam is passed into the bed of reduced metallic alloy to form hydrogen for use in the coal reactor and the regenerated particulate mixture of sand and iron and chromium alloy is returned to the coal reactor, to continue the sequence of carbon removal and to provide heat for the hydrocracking reaction.

15 Claims, 1 Drawing Figure

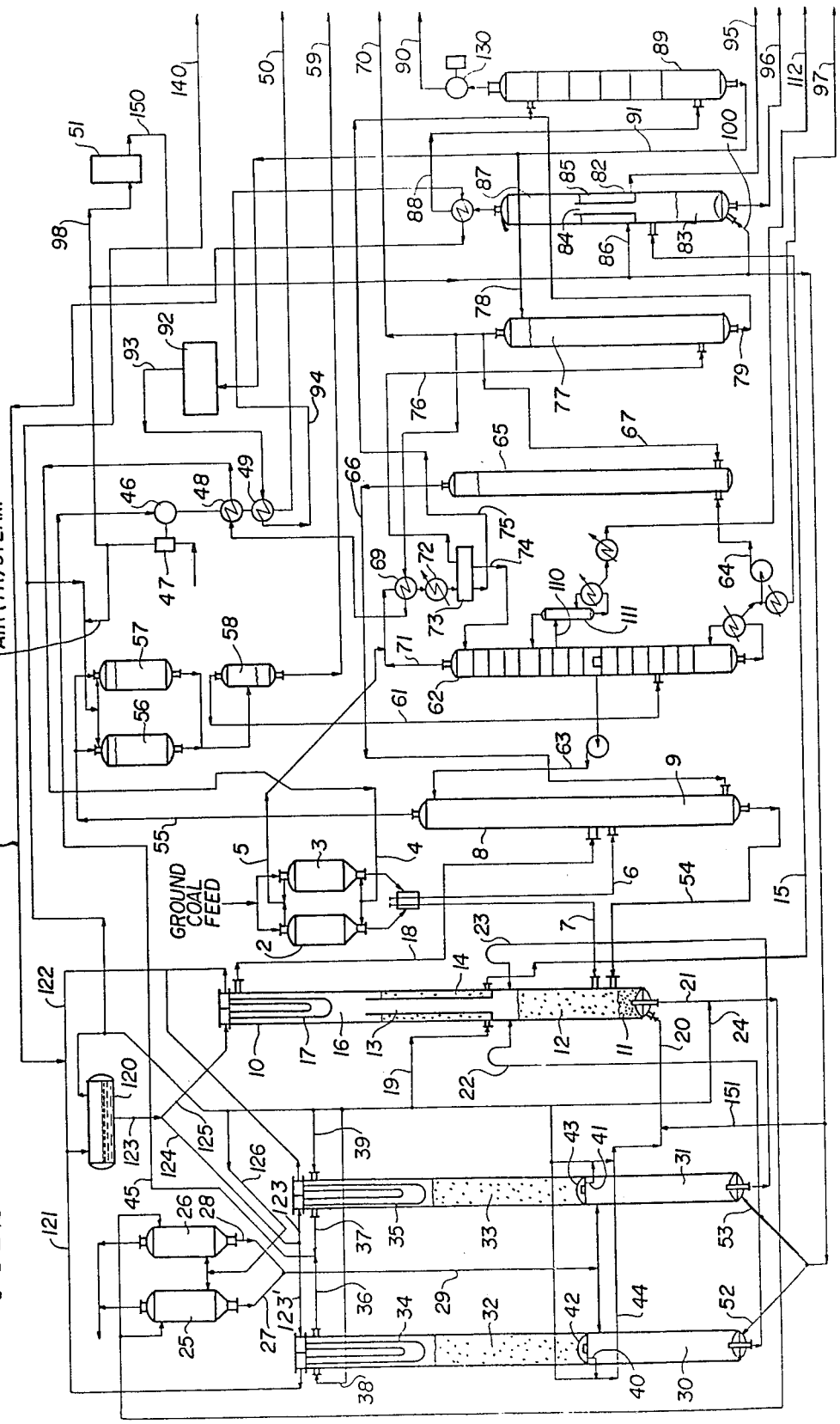

INTEGRATED COAL CONVERSION PROCESS

This is a division of application Ser. No. 858,045, filed Dec. 6, 1977 now U.S. Pat. No. 4,132,627 filed Nov. 2, 1979.

BACKGROUND OF THE INVENTION

1. Field of the Invention

The present invention relates to a method of producing primarily gasoline and fuel gas when processing coal in the presence of superheated steam and fluidized sand. Carbon deposited on the sand is removed by oxidation to provide heat for coal conversion and carbon monoxide for regeneration of a metal reagent hydrogen generator. In the hydrogen generator, which preferably comprises a fixed bed of iron-chromium alloy, carbon monoxide produced by removal of carbon from the sand is passed up through the bed reducing the alloy to the active metal/metallic form and steam is thereafter passed downwardly through the bed to form hydrogen for use in the coal reactor. Distillate diesel oil separated from the coal reactor overhead may be hydrogenated and used for coal extraction prior to recycling along with coal to the coal reactor. A variety of process schemes downstream of the coal reactor may be utilized to remove sulfur, carbon dioxide and coal ash and to recover and/or recycle selected fractions of hydrocarbons from the coal reactor overhead product.

2. Description of the Prior Art

In the prior art the conversion of coal to marketable fuels has generally required substantial purchased or onsite oxygen often costing as much as the coal being processed. Also in the coal conversion processes of the prior art, carbon dioxide formation generally accompanied hydrogen production necessitating expensive carbon dioxide removal procedures. Moreover, where hydrogen production was generated by the interaction of iron and steam according to the Messerchmidt process and others, generally the iron had a tendency to to sinter and agglomerate decreasing the surface area of the iron and, therefore, drastically reducing the activity thereof.

The present invention provides for the use of a bed of iron and chromium alloy for hydrogen generation in order to ameliorate the problem of agglomeration. Also, in accordance with the present invention, the foregoing mode of hydrogen production is integrated with a coal reaction utilizing an admixture of sand and an iron and chromium alloy in order to remove and utilize carbon from the coal reactor to intermittently regenerate the bed of alloy and to provide heat for sustaining the coal conversion process.

BRIEF SUMMARY OF THE INVENTION

The invention relates to a method of converting coal to liquid and gaseous fuels which comprises hydrocracking a coal and oil mixture in a coal reactor in the presence of hydrogen and in the presence of a particulate mixture of sand and iron and chromium alloy to form a spent particulate mixture of sand having a carbon-coating thereon, a spent iron and chromium alloy, coal ash and an overhead product comprising cracked oil vapors and fuel gases. The particulate mixture comprising carbon-coated sand and the spent iron and chromium alloy is withdrawn from said coal reactor and the carbon coating is removed from the sand in the presence of an oxygen-containing gas to form carbon monoxide and a regenerated particulate mixture of sand and regenerated iron and chromium alloy. The carbon monoxide is passed into a bed comprising a particulate oxidized second iron and chromium alloy and the particulate oxidized second alloy is reduced to metallic form. Steam is passed into the bed of said second metallic alloy to form hydrogen and at least a portion of the hydrogen is passed into the coal reactor to effect hydrocracking therein. The regenerated mixture of sand and first iron and chromium alloy is passed into the coal reactor as the mixture of sand and first iron and chromium alloy therein. The first and the second iron and chromium alloys contain from about 5% to about 30% chromium and the particulate mixture of sand and first iron and chromium alloy contains about 10% by weight alloy.

An excess of steam is preferably introduced into the particulate second iron and chromium alloy to form a product stream comprising hydrogen and excess steam, and the product stream is thereafter introduced into the coal reactor to provide at least a portion of the hydrogen and steam requirement therefor.

The particulate bed of second iron and chromium alloy is preferably a fixed bed.

The spent particulate mixture of sand having a coating of carbon thereon and the first iron and chromium alloy is preferably oxidized in a fluidized bed to form carbon monoxide. The carbon monoxide is passed upwardly into a fixed bed of oxidized second iron and chromium alloy to reduce the alloy. Steam is thereafter passed downwardly through the resultant reduced second iron and chromium alloy to form a product gas containing hydrogen, and the product gas is thereafter introduced into the coal reactor to provide hydrogen for effecting hydrocracking therein. Hydrogen production is preferably effected utilizing an excess of steam which is passed downwardly through the reduced second iron and chromium alloy to form a product gas containing hydrogen and excess steam. The product is thereafter introduced directly to the coal reactor to provide at least a portion of the steam and hydrogen requirements therefor.

BRIEF DESCRIPTION OF THE DRAWINGS

FIG. 1 is a schematic illustration of the invention.

DETAILED DESCRIPTION OF THE INVENTION

Having thus described the invention in brief general terms, reference is now made to the schematic drawings in order to provide a better understanding of the present invention.

It is to be understood that the drawings are shown only in such details as are necessary for an understanding of the invention and that various items such as valves, bleed and dispersion steam lines, instrumentation and other process equipment and control means have been omitted therefrom for the sake of simplicity. Referring to the drawing, coal is fed into lock-bins 2 and 3. The coal may be dried in the lock bins with hot recycle gas introduced through line 4. The water removed from the coal is withdrawn via line 5.

Where non-caking coal is employed, the coal may be augered directly via line 7 to coal reactor 10. In the bottom portion of reactor 10 are located a dense phase of sand 11 which operates as a seal to prevent vapors from exiting from the bottom of reactor 10 and a dilute fluidized sand phase 12 which is superimposed over the dense phase of sand 11. The non-caking coal is introduced into dilute sand phase 12.

Where caking-type coal is employed, the dried coal is preferably augered via line 6 to coal-oil extractor tower 8 and introduced into oil layer 9 located in the bottom portion of extractor tower 8. A coal-oil slurry is formed and is pumped via line 54 to coal reactor 10 and introduced into dilute sand phase 12.

The moisture content of the coal on a weight percent basis should preferably be from about 1% to about 50% and most preferably from about 10% to about 30%. Upon contact of coal with the fluidized bed of sand or clay the transformation of the moisture to steam effects disintegration of coal particles.

Ash formed within reactor 10 is blown upwardly through central duct 13 into settling zone 16, settling into ash accumulator 14. The ash is withdrawn from accumulator 14 via line 15 and passed to ash decarbonizer 82. Steam may be injected via line 19 into ash accumulator 14.

At the top of coal reactor 10 a steam generator 17 or equivalent may be employed in order to cool the overhead comprising oil vapors, fuel gas and excess steam prior to passage thereof via line 18 into coal oil extractor 8.

Superheated hydrogen generally at a temperature of from about 1000° F. to about 1800° F. and excess steam from hydrogen generators 32 and 33 are pressured via lines 40, 41, 44 and 20 to the bottom of coal reactor 10.

Carbon coated sand is withdrawn from the bottom of coal reactor 10 via line 21 along with some cooling steam from line 24 and introduced into sand lock-bins 25 and 26. Additional carbon monoxide and hydrogen may be produced by the injection of both steam and oxygen into the carbonated sand or clay as it leaves the coal reactor. CO and $H_2$ are recovered by venting of the $H_2$ as a by-product. Steam may also be introduced into lock-bins 25 and 26 via line 126. The sand is steam pressured via lines 27, 28 and 29 into sand decarbonizer beds 30 and 31. Air is pressured cyclically via lines 52 and 53 to remove carbon from the sand at carbon monoxide formation conditions. The sand with carbon removed, heated by the exothermic carbon monoxide formation oxidation occurring within decarbonizer beds 30 and 31, is steam pressured via lines 22 and 23 to coal reactor 10.

Superimposed over the sand decarbonizers are hydrogen generator 32 and 33 comprising fixed beds of ferrous metal reagent supported on perforated distributors 42 and 43.

In the ferrous metal reagent regeneration cycle, carbon monoxide formed by decarbonization is admitted upwardly through perforated distributors 42 and 43 and through the metal reagent bed. The metal is reduced and the resultant carbon dioxide and nitrogen exit via lines 36, 37 and 45 to drive gas turbine 46 and air compressor 47. Heat is recovered from the hot carbon dioxide and nitrogen gases issuing from the metal reagent beds and is used to generate steam in coils 34 and 35 prior to exiting via lines 36 and 37. Additional heat may be recovered from the exiting gases in exchangers 48 and 49 prior to discharge as stack gas via duct 50.

In the oxidation cycle steam from lines 38 and 39 reacts with the reduced ferrous metal reagent in fixed beds 32 and 33 to generate the hydrogen introduced into coal reactor 10 via line 20 in the manner hereinbefore described.

The overhead from extractor tower 8 comprising diesel, gasoline and fuel gas vapors and steam is withdrawn via line 55, passed through cobalt desulfurizers 56 and 57 and through sulfur disengager 58 to fractionator 62. Elemental sulfur is recovered via line 59. Diesel oil is pumped from the bottom of fractionator 62 via line 64 to high pressure hydrogenator 65. Recycle hydrogen via line 67 is introduced into hydrogenator 65 and is carried with hydrogenated oil via line 66 to the bottom of coal extractor 8. A portion of the diesel oil may be withdrawn as product via line 97.

A gasoline fraction is withdrawn from fractionator 62 via line 110 to stripper 111 and withdrawn via line 112 as product. The overhead from fractionator 62 is withdrawn via line 71 and coolers 69 and 72 to accumulator 73. The hydrocarbon phase from accumulator 73 is refluxed to extinction via line 74 to the top of fractionator 62. The condensed water phase in accumulator 73 is passed via line 75 to carbon dioxide stripper 89. From carbon dioxide stripper 89 the water via line 91 is introduced into water treater 92 and thereafter recycled via lines 93, 94 and 95 to separator 120, which is connected to steam generators/cooling coils 17, 34 and 35 by lines 123, 123', 124 and 125. Fuel gas is pressured via line 76 to carbon dioxide absorber 77 and withdrawn as fuel gas product via line 70.

Regenerated caustic is passed from carbon dioxide stripper 89 via lines 91 and 78 to the top of carbon dioxide absorber 77. Spend caustic is removed from carbon dioxide absorber 77 via line 79 and passed to carbon dioxide stripper 89 for regeneration thereof.

In ash decarbonizer 82, air from line 100 burns the carbon off the ash. Coarse ash accumulates in zone 83 and is withdrawn via duct 84 and settles in settling zone 85 from which it is withdrawn as product via line 95. Additional air, as required, may be introduced via line 86 to burn off additional carbon. A flue gas overhead is removed from zone 87 via line 88 and introduced into carbon dioxide stripper 89 and withdrawn from stripper 89 via line 90 and through gas turbine 130.

Product steam may be recovered via line 140.

Air is introduced via line 98 and compressor 47 to start-up air heater 51 and passed via line 150 to lines 86 and 100 feeding into ash decarbonizer 82, line 151 feeding via line 20 into coal reactor 10 and lines 52 and 53 feeding into sand decarbonizers 30 and 31 respectively.

In accordance with the invention, the predominant part of coal conversion takes place within the coal reactor 10. Within the coal reactor hydrocracking of the coal-oil mixture is prominent to yield gasoline, diesel oil vapors and higher BTU gases such as methane, ethane, etc. A particulate mixture of sand and an alloy of iron and chromium is maintained in the coal reactor. The mixture is comprised of a minor portion of the particulate iron and chromium alloy and a major portion of sand. More specifically, the particulate alloy is preferably present in an amount of about 10% by weight. The granular metal alloy contains from 5 to about 30%, by weight, chromium in order to avoid or minimize sintering of the metal granules and thereby to prevent agglomeration with consequent reduction of surface area. The amount of chromium may vary based on the composition of coal slag, which in turn varies widely for different grades and forms of coal. In addition to the foregoing function, the chromium component of the iron alloy performs the additional function of enhancing hydrocracking in the coal-oil reactor.

The particulate iron and chromium alloy employd in the present invention preferably contains from about 5 to 30 percent, by weight, chromium. The chromium should be present in an amount of at least 2 percent to be effective. The alloy may be a chromiumaustenite steel also containing other elements alloyed therewith such as nickel and cobalt. The particulate size of the alloy utilized in combination with sand as noted above, is preferably within the range of from about 5 to about 500 mesh, the same size range as the sand. The particle size of the iron and chromium alloy used for the hydrogen generator may vary over an even wider range, and for this purpose iron filings and shavings from machine lath operations are suitable.

The sand which is suitable for use in the instant process preferably falls within the range of from about 5 to about 500 mesh. The sand operates to remove carbon formed in the coal reactor which is deposited on the sand, and the sand also provides a means of recovering the heat generated during combustion of the carbon to form carbon monoxide. The sand, therefore, should be resistant to deterioration at the conditions prevailing in the coal reactor and the carbon monoxide generator. The "sand" is also selected for high temperature resistance to coal slags produced by the variety of coal being processed. Examples of types of sand suitable for use in the present invention are silicon dioxide, aluminum oxide and/or mixtures thereof, calcium, magnesium and/or aluminum silicate, fullers earth, or crushed refractory bricks containing silica, alumina, chrome, magnesium oxide, iron oxide, iron silicides, zirconium oxide, calcium oxide, silicon carbide and mixtures thereof.

Examples of clays suitable for use in the present invention are Georgia attapulgas clays ($Al_2O_3 \cdot SiO_2$), Florida clays ($Al_2O_3 \cdot SiO_2 \cdot CaO$) and multicomponent clays such as ($Al_2O_3 \cdot SiO_2 \cdot CaO \cdot MgO$) Georgia, Florida and Texas clays or similar commercially available clays. The commercial clays are refined clays, from which foreign materials such as silt and heavy metals have been removed, and which have been calcined to remove moisture and crushed and screened to sizes of from about 5 to about 500 mesh. The clay may contain an impregnate such as iron, nickel, cobalt, chromium, molybdenum or tungsten. The impregnate generally will be present in an amount of from about 0.05 wt.% to about 50 wt.% and preferably about 0.1 to about 10% by wt. of the clay substrate.

It is preferred to the present invention to use clay in the coal reactor and in the chemical combustion hereinafter described. However, either sand and/or clay may be used, and the terms "sand" and "clay" are employed interchangeably.

Clay is preferred because it takes less fluidizing gases to maintain the fluidized bed and effect reaction therein. The sands tend to be denser than their clay counterpart and, therefore, the retention time of the fluidizing agents, that is, oxygen, steam and/or hydrogen, is less in a fluidizing bed of sand than in one of clay. Also, more fluidizing agent is regenerated when operating with sand than with the clay counterpart. Moreover, the density of certain clays is comparable to the coal feedstock; therefore, homogeneous mixing is enhanced within the fluidized bed. Finally, clay, particularly fine clay of about 200 to about 300 mesh, has an affinity for combining with alkali or alkaline earth metal compounds; therefore, use of clay has the added advantage of effecting removal of such detrimental metallic contaminants.

In the coal reactor the steam which is present reacts with a portion of the carbon to produce hydrogen and carbon monoxide as follows:

$$C + H_2O \rightarrow H_2 + CO$$

Also in the coal reactor, the alloy reacts with the resulting carbon monoxide and steam as follows:

$$CO + FeO \rightarrow Fe + CO_2$$

$$Fe + H_2O \rightarrow H_2 + FeO$$

Accordingly, a portion of the hydrogen for hydrocracking is formed in situ of the coal reactor. Methane formation also occurs in the coal reactor by dealkylation represented as follows:

$$H_2 + 2RH - CH_3 \rightarrow 2RH + 2CH_4$$

The lower molecular weight oil vapors containing gasoline and diesel fuels are produced by hydrocracking. As is readily appreciated, the reactions occurring in the reactor are both exothermic and endothermic in nature; however, it has been found that the constant addition of heat derived from circulating sand maintains the required elevated temperature and the reactions proceed quite rapidly.

It is also believed that when operating the coal reactor at elevated temperatures of from about 1000° F. to 1700° F. in the absence of injected oxygen, the organic oxygen contained in the coal or coal-oil is removed from the coal macromolecule by reaction with the alloy as follows:

$$ROH + Fe \rightarrow FeO + RH$$

$$FeO + CO \rightarrow Fe + CO_2 + heat$$

This method of removing oxygen from coal is preferable to hydrogen consuming organic oxygen removal with hydrogen represented as follows:

$$ROH + H_2 \rightarrow H_2O + RH$$

One advantage of the present invention is that the fluidized bed of sand and alloy in the bottom portion of the coal reactor continuously operates to transfer the heat generated during the formation of carbon monoxide back to the coal reactor, thereby maintaining the coal-oil cracking temperatures and eliminating any requirements for oxygen injection.

During coal conversion a carbon coating accumulates on the granular sand within the coal reactor. The sand is withdrawn from the coal reactor and the carbon coating is removed by oxidation, generally with air. The sand operates as a heat sump for said reaction allowing the obtaining of high temperatures without initiation of afterburning. The resultant heated sand is returned to the coal reactor to provide the heat requirements therein. This cycling of sand serves two purposes; namely, providing heat for the coal reactor and carbon monoxide for the regeneration of a hydrogen generator. This generator is generally superimposed over the carbon removal bed. Steam is passed, preferably, downwardly through the generator to form hydrogen. The simplicity of operation is at once apparent. The heat of formation of carbon monoxide is returned to the coal reactor by recycling of regenerated sands and alloy, and the heat of formation of carbon monoxide to carbon dioxide is retained by the bed of iron and chromium alloy to provide the heat of formation of hydrogen as well as to impart additional heat to the steam and hydrogen product stream which issues from the hydrogenator and is introduced into the coal reactor. As a result of this sequential oxidation, local overheating caused by afterburning in the lower fluidized sand bed is avoided and the heat of combustion is recovered in a most efficient manner. Moreover, this procedure allows for complete combustion, thereby avoiding emission of carbon monoxide into the atmosphere.

In the coal reactor the carbon retained on the ash may be removed by introducing additional steam into the annular ash accumulator, and any residual carbon yet remaining on the ash may be removed after withdrawal of the ash from the coal reactor in an external air burner.

The oil vapor and fuel gas treatment downstream of the coal reactor generally includes cooling, and preferably includes heat exchange in the upper portion of the coal reactor to form steam prior to introduction into an oil extractor tower.

A vaporous overhead containing hydrocarbon fractions in the gasoline and diesel range and lighter fuel gases is withdrawn from the coal oil-extractor, desulfurized, if necessary, and fractionated. Fuel gas and gasoline fractions are recovered as product and at least a portion of the diesel oil is hydrogenated to enhance its hydrogen content and recycled to the coal oil extractor and reactor.

EXAMPLE

A change of Illinois coal containing about 4% sulfur is ground to 100 mesh and finer. Sand and/or clay granules within the size range of 10 to 50 mesh and chromium containing steel alloy granules within the size range of 10 to 80 mesh are admixed in proportions to provide a 10% by weight blend of alloy granules in sand. For the chromium-containing steel alloy in the hydrogenator, metal chips ⅛ to ½ inch in diameter are employed. The alloy used in the sand blend and the fixed bed of the hydrogenator is a 430 ferritic steel containing about 16% chromium.

The coal charge is fed to the coal reactor at the rate of 100 lbs./hr. The coal reactor is operated at a temperature of from about 1200° F. to about 1700° F. and a pressure of about 500 psig. The hydrogenator is operated at a pressure of about 1000 psig and a temperature of from about 750° F. to about 950° F. The temperature within the sand decarbonizer is from about 1300° F. to about 1800° F., and the sand and alloy withdrawn from the sand decarbonizer and fed to the coal reactor is at a temperature of from about 1500° F. to about 1700° F. The diesel product is recycled to extinction and 72% of the coal value is recovered as follows:

| Gasoline Product | 30% of coal value |
|---|---|
| Industrial Hydrogen | 20% of coal value |
| Methane Plus Gases | 22% of coal value |

Another aspect of the invention is illustrated by FIG. 2. The process illustrated in FIG. 2 places emphasis on electricity production.

Coal feed in particulate form and preferably ¼ inch or less in diameter is charged via line 201 into lock-bins 202 and 203. The coal may be partially dried, but should have a moisture content of from about 5 to about 20% by weight. The coal is air pressured and/or augered through piping system 204 to the bottom zone of coal reactor 205. The coal is injected into a fluidized bed of clay, which clay preferably contains a catalytic metallic component for catalysis of coal conversion. The clay is preferably an attapulgas clay, suitably Georgia type attapulgas clay, impregnated with a tungsten coating. Upon injection into fluidized clay bed 206, the coal particles are disintegrated by the transformation of the moisture contained within the coal to steam. This transformation is a result of coal particle contact with the hot fluidized clay bed 206.

Steam 207 and air 208 are injected through bottom distributor plate 209, and the coal is rapidly, within a few seconds, converted to gaseous fuels including hydrogen, carbon monoxide, methane, ethane, ethylene, propane, etc. Concurrently, powdered ash residue resulting from the coal conversion is blown upward via area restricted central duct 210. The powdered ash residue settles out in ash accumulator 211. The ash may then be decarbonized by air and steam injection via lines 212 and 213 respectively, and the ash product is withdrawn via line 214 to storage.

The carbon content of the ash may be retained thereon. Indeed conditions may be adjusted to obtain ash carbon content of from about 10% weight to about 80% weight, such high carbon content ash being suitable for dry pipelining to chemical plants. Where high carbon content is desired, the process is operated at a high coal ratio to produce a carbonated ash product containing from about 10% weight to about 80% weight carbon.

A unique feature of the present invention is that the ascending fuel vapor product is treated within the upper portion of the reactor. The fuel vapors pass upwardly into reactor zone 216 via restricted central duct 215, which duct is perforated, and preferably controlled with the base forming the fuel vapor inlet. Calcium oxide, dolomite ($CaCO_3 \cdot MgCO_3$) or equivalents thereof are injected into reactor zone 216 and react with hydrogen sulfide which is present in the fuel gas to form calcium sulfide as represented below:

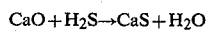

$$CaO + H_2S \rightarrow CaS + H_2O$$

Chlorine which is present in the fuel gas also reacts with calcium oxide to form calcium chloride as follows:

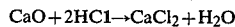

$$CaO + 2HCl \rightarrow CaCl_2 + H_2O$$

The calcium sulfide and calcium chloride so formed flow upwardly into reactor zone 217 and settle in annular chamber 218. Calcium sulfide and calcium chloride are withdrawn as a byproduct via line 219. The denser CaO which remains unreacted accumulates in annular chamber 220 encircling restricted control conduit 215 and may be withdrawn and recycled. Specific gravities of the calcium salts are as follows:

|  | Specific Gravity |
|---|---|
| CaS | 2.18 |
| $CaCl_2$ | 2.51 |
| CaO | 3.346 |

The gaseous overhead fuel product is cooled by steam generator coil 221. The gaseous product and any remaining excess steam are pressured via line 222 to oil absorber tower 223.

In oil absorber tower 223, the condensed liquid product comprising the middle distillate diesel oil fraction is circulated via line 224. The entrained solids carried over into oil absorber tower 223 accumulate in the heavy oil recycle and are returned to the coal reactor via line 225. Accordingly, solid removal is effected substantially via ash draw line 214. A distilled oil product may be withdrawn via line 226. A portion of the fuel gas may be recovered as product via lines 228, and the remainder may be fed via line 229 to chemical combustor 230.

In chemical combustor 230, the fuel gas is burned by contact of the fuel with a fluidized bed of metal-impregnated clay denoted by number 231. Contact is effected at a temperature of from about 1500° F. to about 2000° F. and preferably about 1800° F. to about 2000° F. Air is introduced into combustor 230 via line 232, and steam is introduced into combuster 230 via line 233. Substantially complete combustion of the fuel gas is effected, preferably utilizing air in substantially a stoichiometric amount. Air containing oxygen in excess of the stoichiometric amount required to effect complete combustion of the fuel gas may be used; however, the use of insufficient air will result in incomplete combustion with attendent energy loss and decrease in the efficiency of the overall process. Steam generator coil 234 is operated to maintain the combustion temperature at about 2000° F. or less in order to minimize nitrogen oxide emissions. The metal impregnated clay preferably comprises a clay, selected from the group consisting of iron, iron-chromium alloy, iron-chromium-nickel alloy, cobalt, cobalt silicide, iron-silicide or materials of similar reactivity, and the metal impregnate is preferable selected from the group consisting of tungsten and similarly reactive high melting heavy metals.

The particle size of the metal-impregnated clay may vary from about 15 mesh to about 100 mesh.

Where the preferred metal impregnate, tungsten, is utilized in combustor 230, the particles containing tungsten in oxide form are concentrated at the upper portion of the fluidized bed. The tungsten oxide component of the particles provides oxygen for combustion of fuel gas. Upon reduction, the metallic tungsten-coated particles gravitate to the bottom of the fluidized bed where they are oxidized. The oxidized particles migrate to the upper portion of the fluidized bed to repeat the sequence. The recirculation of particles is a consequence of differing specific gravities. Tungsten metal has a specific gravity of 19.3; the trioxide form of tungsten has a gravity of 7.16, and the dioxide forms of tungsten has a specific gravity of 12.0. Since tungsten oxidizes readily at the combustion temperature maintained within combustor 230 (namely, from about 1800° F. to 2000° F.), fuel combustion is readily maintained at an efficient level, even in the presence of excess cooling steam. The velocity of the fluidizing gases is adjusted in a manner well known in the art to obviate solid entrainment in the exiting gases. In the event of solid entrainment, the tortuous path of the exiting gases formed by a baffle arrangement such as illustrated by baffles 235 and 236 permits recovery of such entrained solids and withdrawal via side bottom drain line 237. The combustor may conveniently be encased for cooling purposes within a water-jacket. Cooling effected by heat exchange in the foregoing manner is employed to maintain combustion gases exiting via line 250 at temperatures within the range of from about 1500° F. to about 2400° F. and preferably for about 1800° F. to about 2000° F. to prevent injuring the blades of turbine 260.

The combustion gases via line 250 drive gas turbine 260 which in turn drives air compressor 270 and electric generator 280.

EXAMPLE

An example of a pilot plant operation performance run is shown below:

| | | |
|---|---|---|
| Coal charge (Illinois coal) | | 100 lbs./hr. |
| Fuel gas product | % coal energy | |
| carbon monoxide | 10% | |
| methane | 18 | |
| ethane | 5 | |
| ethylene | 6 | |
| propane | 3 | |
| hydrogen | 28 | |
| | 70 | |
| Reactor pressure | | 500 p.s.i.g. |
| Reactor temperatures | | |
| bottom zone | | 1550° F. |
| top zone | | 815° F. |
| Cobalt treater temperature | | 810° F. |
| Combustor temperatures | | |
| prior to steam quench | | 1910° F. |
| after steam quench | | 1540° F. |

The clay utilized in the coal reactor is 30 to 60 mesh Attapulgas clay impregnated with 0.15% by weight tungsten. The clay utilized in the combustor is 20 to 50 mesh Florida clay impregnated with 0.25% by weight tungsten. 300 mesh Georgia clay in an amount of about 0.01% by weight based on coal feed, is injected into the coal reactor along with the coal feed in order to neutralize the sodium in the coal ash. This clay is removed with the ash product. The transformation of coal to electricity has a thermal efficiency of 50% to 55%.

FIG. 3 represents yet another aspect of the invention, combining the coal reaction scheme described in FIG. 2 with municipal solid waste treatment to recover fuel values therefrom and produce electricity. The feature CaO treatment may be omitted in the combined coal and municipal waste conversion method illustrated in FIG. 3, in which event other means of desulfurization are preferably employed.

Coal feed in particulate form and preferably ¼ inch or less in diameter is charged into lock-bins 302 and 303 via line 301. The coal may be partially dried, but should preferably contain a moisture content of from about 1% weight to about 20% weight. The coal is air pressured and/or augered through pipe systems 304 and 305 into a fluidized bed of clay in the manner and under the conditions heretofor described in connecting with the process described in FIG. 2. Steam 306 and air 307 are injected through bottom distributor plate 308 into coal reactor 315, and the coal is rapidly, within a few seconds, converted to gaseous fuels. The gaseous fuels at the elevated temperatures of production are withdrawn overhead via line 309. Concurrently, the powdered ash residue resulting from the coal conversion is blown upward via area restricted central duct 310 to then settle out in ash accumulator 311, an annular chamber defined by the outer wall of coal reactor 315 and central duct 310. The ash product is discharged via line 312.

Solid wastes, for example, residential home solid wastes, are introduced via line 321 into multiple lock-bins 322 and 323. When the lock-bins are filled, hot coal producer gases via lines 309 and 325 are fed into the bottom of the solid waste filled lock-bins at a temperature of from about 700° F. to about 1000° F. to rapidly heat the solid wastes. Air from line 335 and steam from lines 336 and 337 are introduced into the bottom portion of lock-bins 322 and 323 to gasify the solid wastes. When the combustible portion of the solid wastes has been gasified, the residual inorganic portion is withdrawn via lines 338, 339 and 340. The gasified portion of the solid wastes is pressured from the top of lock-bins 322 and 323 via lines 341 and 342 respectively. A portion of the coal producer gas from line 309 via lines 343 and 344 may be used to temperature quench the gasified solid waste producer gas.

The combined producer gases from the coal reactor and solid waste converters are pressured via line 345 into cobalt desulfurization unit 346. Sulfur is recovered via line 347. Desulfurized fuel gases are withdrawn from the desulfurizer via line 348. A portion of the fuel gases may be recovered via line 349. At least a portion of the desulfurized fuel gases are introduced via line 350 into combustor 355. Combustor 355 is operated in the same manner as combustor 230. The combustion gases are withdrawn from combustor 355 via line 356 to drive gas turbine 360 which in turn drives air compressor 370 and electric generator 380.

The steam utilized in the process may be generated in steam generators 390 and 391.

EXAMPLE

An example of the pilot plant operation parameters is set forth below:

| | |
|---|---|
| Solid waste charge | 200 lbs./hr. |
| Coal charge | 10 lbs./hr. |
| Coal reactor pressure | 520 p.s.i.g. |
| Solid waste reactor pressure | 500 p.s.i.g. |
| Solid waste reactor temperature | 1750° F. |
| Solid waste reactor inorganic yield | 20% by weight |
| Combustor bed temperature | 1875° F. |
| Solid waste to electric thermal efficiency | 50% by weight |

The type of solid organic waste materials suitable for conversion to liquid and gaseous fuels are well known. Organic waste materials most suitable for this invention are those materials cellulosic in nature such as ground paper, sawdust or ground leaves. Also suitable are other residential waste materials such as waste food materials and used clothing, etc. Industrial wastes which are organic in nature are also suitable and, in this regard, rubber tires may be converted in accordance with this process.

Residential waste when collected generally contains glass, iron, dirt and other inorganic components; therefore, removal of at least a portion of such materials prior to conversion in accordance with this process is desirable. This can be accomplished routinely by first running the waste material through a hammermill to obtain particles of 6 inch or less diameter. Thereafter the iron components of the waste may be removed by magnetic drum. The remainder of the waste material is changed to the conversion chambers 322 and 323 heretofore described to effect gasification of the solid organic component with the hot fuel gas product derived from the coal conversion step of this invention. The process can be adapted for either cyclic or continuous waste feed. The non-converted waste component is removed from the bottom of multiple lock-bins 322 and 323.

In a general manner, while there has been disclosed an effective and efficient embodiment of the invention, it should be well understood that the invention is not limited to such an embodiment as there might be changes made in the arrangement, disposition, and form of the parts without departing from the principle of the present invention as comprehended within the scope of the accompanying claims.

What I claim is:

1. A method of converting coal to liquid and gaseous fuels comprising the steps of:
   (a) introducing coal having a moisture content of from about 10 wt. % to about 30 wt. % into a vertically elongated coal reactor having a fluidized bed of sand and/or clay in the bottom portion thereof;
   (b) introducing superheated hydrogen at a temperature of from about 1000° F. to about 1800° F. into the bottom of said coal reactor;
   (c) transforming said moisture to steam to disintegrate said coal; and
   (d) converting said disintegrated coal at a temperature from about 1200° F. to about 1700° F. to liquid and gaseous fuels comprising carbon monoxide and hydrogen.

2. The method of claim 1 wherein the coal has a moisture content of from about 10 wt. % to about 20 wt. %.

3. The method of claim 1 wherein said fluidized bed is of Attapulgas-type clay.

4. The method of claim 1 and further comprising the step of introducing superheated steam into the bottom of said coal reactor.

5. The method of claim 1 further characterized in that fluidization of said fluidized bed is effected with air, steam and gaseous fuel product recovered overhead from the coal reaction.

6. The method of claim 3 further characterized in that said clay contains a metallic catalytic component.

7. The method of claim 6 further characterized in that said clay contains a tungsten impregnate.

8. The method of claim 3 wherein said fluidized bed is of Attapulgas-type clay.

9. The method of claim 1, wherein the coal has a moisture content of about 20 wt. %.

10. A method of converting coal to liquid and gaseous fuels comprising the steps of:
    (a) introducing coal having a moisture content of from about 6 wt. % to about 30 wt. % into a vertically elongated coal reactor having a fluidized bed of sand and/or clay in the bottom portion thereof;
    (b) introducing superheated steam at a temperature of from about 1000° F. to about 1800° F. into the bottom of said coal reactor;
    (c) transforming said moisture to steam to disintegrate said coal; and
    (d) converting said disintegrated coal at a temperature from about 1200° F. to about 1700° F. to liquid and gaseous fuels comprising carbon monoxide and hydrogen.

11. The method of claim 10 further characterized in that fluidization of said fluidized bed is effected with air, steam and gaseous fuel product recovered overhead from the coal reaction.

12. The method of claim 1 wherein the coal has a moisture content of from about 10 wt. % to about 20 wt. %.

13. The method of claim 10 further characterized in that said clay contains a metallic catalytic component.

14. The method of claim 13 further characterized in that said clay contains a tungsten impregnate.

15. The method of claim 10, wherein the coal has a moisture content of about 20 wt. %.

* * * * *